United States Patent

[11] 3,602,692

| [72] | Inventor | Glen H. Morey<br>Terre Haute, Ind. |
|---|---|---|
| [21] | Appl. No. | 861,055 |
| [22] | Filed | Sept. 25, 1969 |
| [45] | Patented | Aug. 31, 1971 |
| [73] | Assignee | Templeton Coal Company<br>Terre Haute, Ind. |

[54] ELECTRICALLY HEATED MANTLE WITH A SEAL ARRANGEMENT
4 Claims, 6 Drawing Figs.

[52] U.S. Cl. ........................................ 219/535,
219/433, 219/438, 219/536, 219/521, 219/528,
277/34, 285/97
[51] Int. Cl. ........................................ H05b 3/58
[50] Field of Search ........................................ 219/433,
521, 535, 438, 528–529, 536; 49/477; 277/34,
34.3, 34.6; 285/97; 202/269

[56]         References Cited
         UNITED STATES PATENTS

| 794,987 | 8/1905 | Kneuper | 285/97 X |
| 2,739,220 | 3/1956 | Morey | 219/535 |
| 3,023,995 | 3/1962 | Hopkins | 277/34 X |
| 3,177,343 | 4/1965 | Morey | 219/535 X |
| 3,177,344 | 4/1965 | Morey | 219/535 X |

*Primary Examiner*—Volodymyr Y. Mayewsky
*Attorney*—Melvin A. Crosby

ABSTRACT: An electrically heated mantle having a frame and an inflatable annular seal element, especially adapted to be mounted on said heating mantle in encircling relation to a vessel therein. The seal element, when inflated, sealingly engages the frame of the heating mantle and the vessel and seals the heating mantle against the ingress of fluids.

PATENTED AUG 31 1971 3,602,692
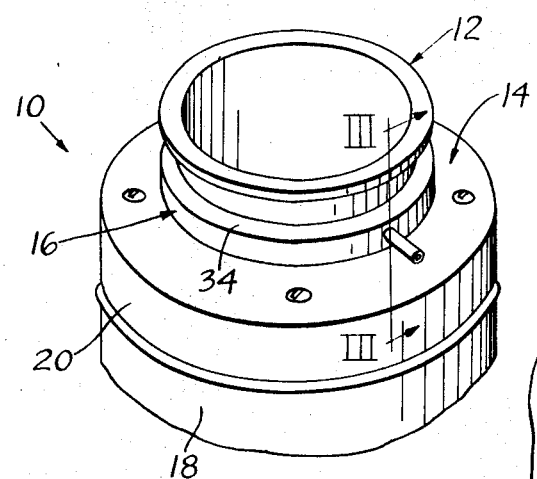
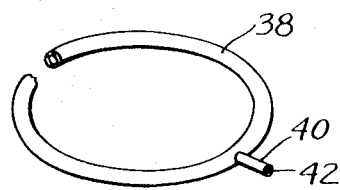
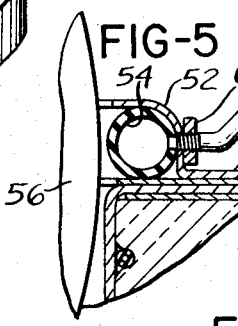
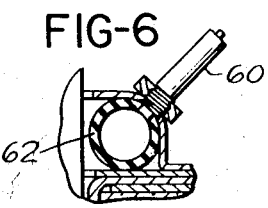
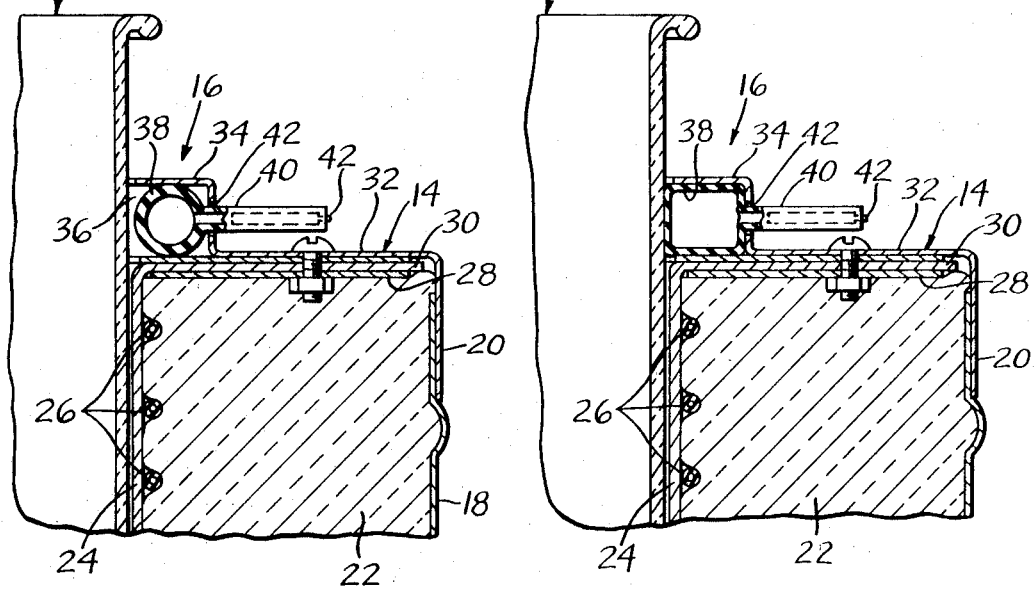
INVENTOR.
GLEN H. MOREY
BY

ELECTRICALLY HEATED MANTLE WITH A SEAL ARRANGEMENT

RELATED APPLICATION

This application is related to my pending application, Ser. No. 721,399; filed: Apr. 15, 1968, entitled: Method and Apparatus for Sealing a Vessel to a Heating Mantle.

BRIEF SUMMARY OF THE INVENTION

According to the present invention, a heating mantle having a top wall with an aperture for receiving a vessel to be heated is provided with an inwardly opening channel surrounding the aperture and mounted in the channel is a flexible inflatable annular element. When the element is deflated, the vessel can be easily mounted in or removed from the heating mantle; but when the element if inflated, it expands into sealing engagement with the vessel and with the mantle thereby effectively sealing the interior of the mantle against the entry of fluids that might be spilled on top of the mantle.

This invention relates to a sealing arrangement, particularly for sealing between the frame of a heating mantle, and a vessel being heated by the heating mantle.

Heating mantles of the type having a metal frame with an opening in the top to receive a vessel to be heated and having a fabric support on which the vessel rests and which fabric support carries electric heating element means are known and are widely used in laboratories and the like. Such heating mantles are eminently satisfactory for heating flasks and beakers and like vessels and are thereby preferred over open flames because of the substantial reduction in fire and explosion hazards.

It is often the case, however, that a vessel will boil over or that in supplying liquids thereto some will be spilled and in either case the tendency is for the boiled-over or spilled liquids to run down the side of the vessel and into the heating mantle. Such liquid flowing into the heating mantle can create the danger of the development of noxious or toxic fumes, creates an explosion and fire hazard and, furthermore, can create a dangerous condition because of shorting the electric heating element.

In my copending application, Ser. No. 721,399; filed: Apr. 15, 1968, and entitled: Method and Apparatus for Sealing a Vessel to a Heating Mantle, there is shown a sealing arrangement for such a heating mantle in which a resilient rubberlike member is supported on the frame of the heating mantle about the opening through which the vessel is introduced into the heating mantle and with a mechanical device provided for compressing the resilient element about the periphery of the vessel.

The described arrangement of the above-mentioned application has the merit of effecting a seal between the heating mantle and the vessel, but is somewhat expensive and can be difficult to manipulate and the resilient member does not always conform exactly to irregularities found in the surface of some vessels.

With the foregoing in mind, the present invention has as a primary objective the provision of an improved sealing arrangement especially adapted for sealing between a heating mantle and a vessel mounted therein.

Another object of this invention is the provision of an inexpensive sealing arrangement of the nature referred to above.

Still another object is the provision of a sealing arrangement for sealing between a heating mantle and a vessel therein in which the sealing element efficiently seals between the vessel and the heating mantle even when irregularities are found in the surfaces to be sealed.

Still another object is the provision of a sealing arrangement of the nature referred to in which the seal element is adapted for accommodating vessels which vary in diameter.

These and other objects and advantages of the present invention will become more apparent upon reference to the following detailed specification, taken in connection with the accompanying drawings, in which:

FIG. 1 is a perspective view showing the upper end of a heating mantle and a vessel mounted therein and having a seal arrangement according to the present invention;

FIG. 2 is a perspective view showing the seal element employed;

FIG. 3 is a fragmentary cross-sectional view indicated by line III—III on FIG. 1 and showing the seal element deflated;

FIG. 4 is a view like FIG. 3, but shows the sealing element inflated;

FIG. 5 is a fragmentary view showing a modified arrangement; and

FIG. 6 is a fragmentary view showing a modification.

DETAILED DESCRIPTION

Referring to the drawings, in FIG. 1 the heating mantle is generally indicated at 10 and the vessel mounted therein to be heated by the heating mantle is indicated at 12. The top wall 14 of the heating mantle has a central opening or aperture through which vessel 12 extends and, in accordance with the present invention, a sealing arrangement generally indicated at 16, is provided about the opening in the top wall for sealing against the outer wall of vessel 12.

Reference to FIGS. 3 and 4 will show that the heating mantle comprises an axial sidewall 18, preferably of metal, and the top wall 14 has a dependent flange 20 surrounding the upper end of top wall 14. Within the interior of the heating mantle is a body of heat-insulating material 22 which surrounds the fabric element 24 in which vessel 12 is supported. Fabric element 24 has stitched thereto electric heating element means 26 which, when energized, effectively transmits heat into vessel 12. Fabric 24 may consist of glass fiber or quartz fibers or asbestos or combinations thereof in order to withstand the temperatures developed by the electric heating element means. The peripheral portion of fabric 24 extends radially outwardly and forms a part of top wall 14.

As will be seen, top wall 14 comprises a lower annular plate 28 and an upper annular plate 30 between which the marginal portion of fabric 24 is clamped. Above upper plate 30 is a Spun-metal member 32 which comprises the axial flange 20 dependent from the outer periphery, whereas the inner marginal portion of plate 32 is formed with a step 34.

Step 34 and the inner marginal portion of plate 30 define a channel 36 opening radially inwardly toward vessel 12. Mounted in channel 36 is the hollow annular inflatable resilient seal element 38 having a filling stem 40 extending outwardly through a hole 42 in the step portion 34 of plate 32. Stem 40, preferably, has a valve 42 therein so that sealing element 38 can be inflated and the inflating fluid will be entrapped therein while valve 42 can be selectively operated to deflate the sealing element.

In FIG. 3, sealing element 38 is shown in deflated condition and it will be noted that vessel 12 can easily be mounted in and removed from the heating mantle with substantially no interference from the sealing element.

When the sealing element is inflated, however, it assumes the condition in which it is shown in FIG. 4, wherein the element is inflated so as substantially to fill channel 36 while being pressed against the outer surface of vessel 12 in sealing engagement therewith. Since element 38 is flexible, it conforms to any irregularities in the surfaces which it engages and, thus, forms a highly effective seal between the frame of the heating mantle and the vessel being sealed.

FIG. 5 shows how the top plate portion 50 of the top wall of the heating mantle could have the step 52 formed therein so as substantially to conform to the contour of the inflatable sealing element 54. In FIG. 5, substantially the entire expansion of the sealing element takes place radially inwardly toward the wall of vessel 56.

FIG. 5 also shows that filling stem 58 for the heating element could be angled off in the upward direction for greater convenience, if so desired. The stem 58 could also have a threaded region toward the lower end thereof and be provided with a clamp nut 60 to hold the stem fixedly in place for easier inflation and deflation of sealing element 54.

FIG. 5 also shows that the vessel being sealed could be substantially spherical, as in the case of a flask, and that the sealing element is still so constructed and arranged as to form effective sealing engagement therewith.

The stem 58 instead of being angled off as shown in FIG. 5 could, of course, merely be connected to the sealing element so as to extend angularly upwardly therefrom as shown in FIG. 6, wherein stem 60 will be seen to be disposed at an upwardly extending angle from sealing element 62.

Most laboratories wherein the sealing element according to the present invention would be employed are provided with compressed air which could be used for inflating the seal elements, but in the absence of a supply of compressed air, a simple pump, such as are employed for inflating footballs and basketballs could be employed.

It will be understood that modifications can be made within the scope of the appended claims.

What is claimed is:

1. In combination: a heating mantle comprising a tubular frame being closed at the bottom and open at the top, said frame having inner and outer spaced walls, electrical heating means in said frame and being attached to said inner walls, heat-insulating material filling the space between said inner and outer walls, the top of said frame having an aperture through which a vessel extends while being heated by the heating means of said mantle, seal means on said top defining a channel surrounding said aperture and opening radially inwardly toward the center of said aperture while being closed toward the top and bottom and on the radially outer side by confining walls, said aperture providing only a small radial clearance about said vessel and said mantle supporting a vessel introduced through said aperture at a level such that the vessel presents an annular surface toward said channel, a flexible hollow inflatable annular ring confined in said channel and adapted to expand when inflated, said ring when uninflated permitting a vessel to be freely mounted in or removed from said aperture and when inflated expanding so as substantially to fill said channel and seal against the confining walls thereof and also expanding radially inwardly into sealing engagement with said annular surface of said vessel, and fluid connection means for inflating and deflating said ring.

2. The combination according to claim 1, in which said ring is formed of rubberlike material and comprises a hollow tube projecting therefrom, and a valve in said tube operable to entrap fluid in said ring and adapted for selective operation to release fluid from said ring.

3. The combination according to claim 1, in which said top comprises a lower annular plate and an upper annular plate resting on said lower plate and having a step formed therein about the inner marginal portion thereof, the upper side of the inner marginal portion of said lower annular plate and the inside surface of the said inner marginal portion of said upper annular plate defining said channel and confining said ring from the top and bottom and radially outer sides thereof.

4. The combination according to claim 3, in which said upper plate comprises a hole, and the means for inflating and deflating said ring comprising a valved stem leading therefrom through said hole in a direction away from said aperture.